Feb. 17, 1948.     M. C. MILLER     2,436,262
APPARATUS FOR MEASURING TURBIDITY PHOTOELECTRICALLY
Filed April 29, 1944
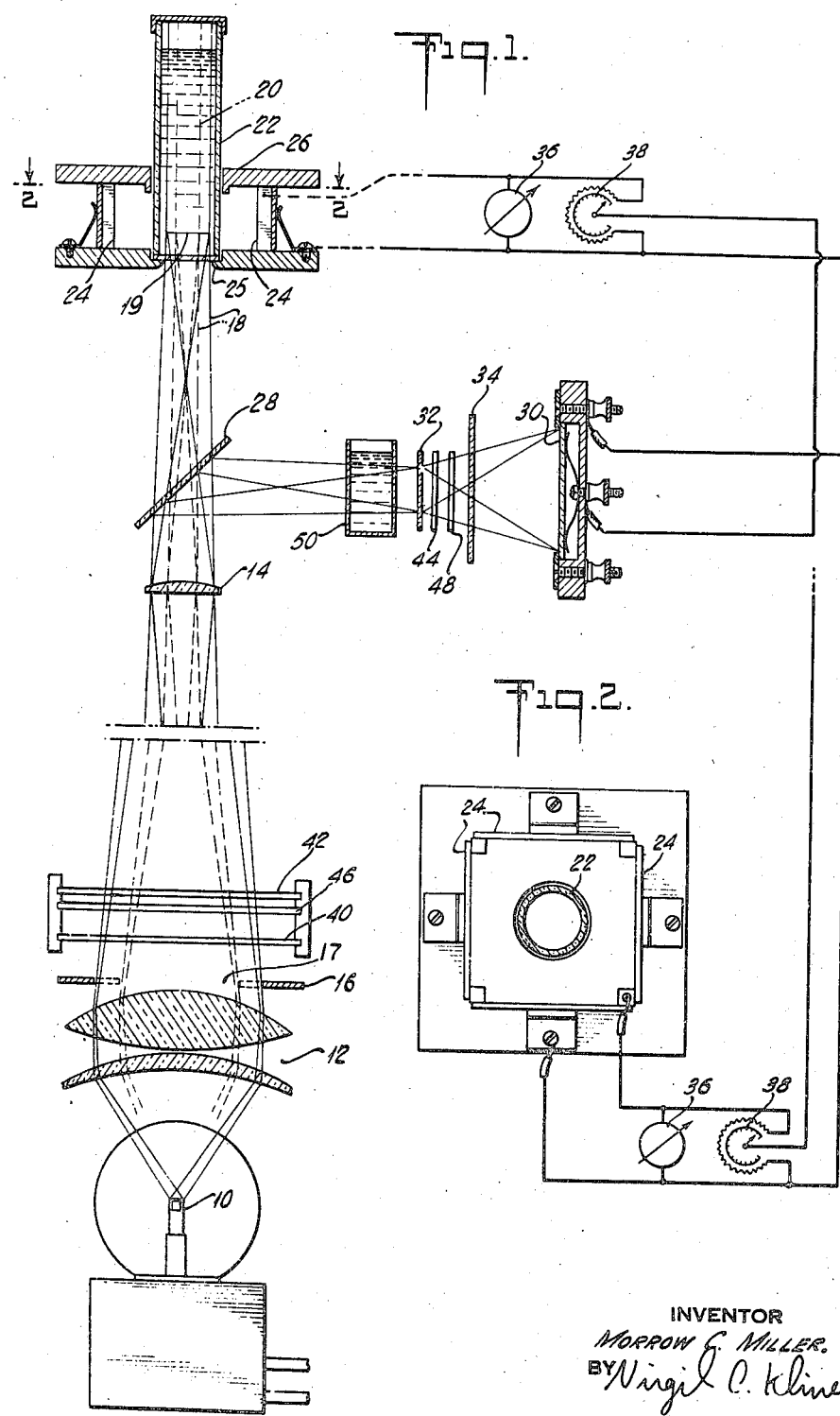
INVENTOR
MORROW C. MILLER.
BY Virgil C. Kline
ATTORNEY Patented Feb. 17, 1948

2,436,262

UNITED STATES PATENT OFFICE 2,436,262

APPARATUS FOR MEASURING TURBIDITY PHOTOELECTRICALLY

Morrow C. Miller, Martinsville, N. J., assignor to Johns-Manville Corporation, New York, N. Y., a corporation of New York Application April 29, 1944, Serial No. 533,303

2 Claims. (Cl. 88—14)

This invention relates to improvements in apparatus designed for determining the turbidity of substantially colorless liquids of very low dispersed particle content and of liquids so highly colored as to partially mask turbidity.

Methods and apparatus heretofore proposed for measuring the turbidity of a fluid (for example, measuring the clarity of a raw sugar filtrate), have generally been based on observation and comparison of illumination intensities of light rays which are scattered in all directions through the fluid under examination by reflection or dispersion of suspended particles in the fluid when illuminated by a beam of light. Even when the sizes of the particles and their concentration are small, a fairly accurate measure of their concentration may be obtained by a skilled operator by observation of the light intensity of rays which are scattered in a direction making a definite angle (frequently 90°) with the direction of the incident beam. This is the so-called Tyndall beam effect, and instruments for measuring the amount of light deflected are frequently designated as turbidity or Tyndall meters. The present invention includes improvements on the method and apparatus which are described in U. S. Patent #2,045,124, granted June 23, 1936, to Cummins, Badollet and Miller.

The turbidity meter of the aforesaid patent operates by projecting a beam of incident light of small section and high intensity into a turbid liquid under examination. A system of lenses is arranged for collecting and transmitting some of the emerging Tyndall rays as a beam which is focused on a comparison element. Another system of lenses is arranged for focusing on the comparison element a comparison beam of light of substantially uniform intensity and having a known proportional relation to the intensity of the incident beam. The instrument includes an eyepiece for viewing the comparison element and for reimaging the Tyndall beam upon the entrance pupil of the eye of the observer. The accuracy of the turbidity measuring observations obtainable by employing apparatus of the type herein described does not depend on the experience and skill of the observer and his ability to distinguish between variations of light intensity and shading. The measurement is, therefore, free from the errors introduced by visual observation, and also free from any errors resulting from losses or gains of deflected light such as may be caused, respectively, by color absorption or by stray light reflection. Instruments of the type herein described are accurate and reliable in the hands of an unskilled operator, and they furthermore incorporate simple lens systems and employ simple controls such as to make them inexpensive, readily portable and so easily operated as to adapt them for extensive general use by operators of moderate skill and experience.

A primary object of the present invention is to provide apparatus adapted for measuring in an accurate and positive manner turbidities of substantially colorless liquids of low turbidity and of highly colored liquids.

A further object is to provide an improved turbidity meter which is comparatively simple and inexpensive, readily portable, and which can be relied on to give accurate turbidity measurements when used by a comparatively unskilled operator.

The invention contemplates employment of a photo-electric cell unit in position for viewing the emergent Tyndall rays, thereby developing electric current having a magnitude which is proportional to the intensity of the Tyndall beam. Since a photo-electric cell which is positioned to view the Tyndall beam develops fluctuations in currents which are not proportional to turbidity, whenever there is any variation in the illumination of the light source, according to this invention some of the light rays of the incident beam are deflected to form a comparison beam, the light intensity of which is proportional to that of the incident beam and is measured by a second comparison photo-electric cell which is mounted in closed circuit with the first measuring cell. Incorporated in said circuit is a balancing bridge including a calibrated variable resistance and a galvanometer, whereby the current generated in the measuring cell can be balanced against the current generated in the comparison cell. Readings thereby obtained by balancing the sensitive galvanometer express the intensity of the Tyndall beam emerging from the turbid liquid as a percentage of the incident beam.

An emergent Tyndall beam from a liquid of low turbidity has a very low illumination intensity, and the conventional photo-electric cell possesses insufficient sensitivity to develop satisfactorily accurate turbidity measurements based on such low intensity illumination. A feature of the invention consists in employing a set of photo-electric cells of the barrier layer type arranged to enclose a substantial proportion of the total volume of the turbid liquid which is illuminated by the incident beam, whereby to view and absorb a high proportion of the emergent Tyndall beam rays and thereby generate sufficient current to provide sensitive measurements of turbidity.

When making turbidity measurements of filtrates or suspensions of particles in highly colored liquids, the accuracy of the measurements is affected by color absorption of light of the incident beam and of the emergent Tyndall beam. Moreover, turbidity measurements of filtrates or suspensions in liquids which are colorless, or substantially colorless, are sometimes rendered inaccurate by stray light reflections. Another feature of the invention resides in providing means for balancing out or correcting inaccuracies of turbidity measurements caused by color absorption of Tyndall beam light, or by stray light effects. An incidental feature is the provision of means whereby to measure the color of the liquid as well as its clarity. The instrument is designed for measuring the color of liquids in terms of the comparison transmission of light of a color which is strongly absorbed by the liquid. For this purpose broad band absorption filters are used. Color measurements of this type indicate the amount of coloring matter present in the liquid solvent. Elements for color measurement are incorporated in the instrument primarily as an aid in correcting for the masking effect of color on turbidity measurements.

Another feature of the invention involves means for adjusting the diameter of the incident beam. When making turbidity measurements of filtrates or liquids which are deeply colored, the diameter of the incident beam is made relatively large and only slightly less than the diameter of the column of liquid which is under examination. The average length of path of the emergent Tyndall beams exposed to color absorption is thereby substantially reduced. For examining substantially colorless liquids an incident beam of small diameter and more nearly parallel light rays is provided to correct for possible inaccuracies of Tyndall beam measurements resulting from stray light reflection.

Other important objects and features of the invention will appear from the following description of a preferred embodiment of the invention.

In the accompanying drawing,

Fig. 1 is a diagrammatic assembly view which portrays the optical system and the photo-electric circuits of a preferred form of apparatus for the practice of the invention; and Fig. 2 is a diagrammatic plan view showing the measuring cell unit of the balanced photo-electric circuit of Fig. 1.

Referring to the drawings, the optical elements of the apparatus as portrayed in Fig. 1 include a lamp or light source 10 which may be supplied with electric current through a step down transformer of constant output voltage. A lens 12 projects light rays emitted from source 10 as a concentrated light beam. Lens 12 is mounted in position to focus an image of the lamp 10 on a lens 14. Interposed between the light beam focusing surface of the lens 12 and lens 14 is an apertured diaphragm 16 having an aperture 17 the size of which is adjustable to vary the size of the beam of light transmitted by lens 12. Lens 14 is illuminated and projects such illumination as a beam of light 18 which focuses an image of the aperture 17 at a position 19 in a body of liquid 20 which is under examination for turbidity in a container 22.

Container 22 is shown as a cylindrical vessel mounted coaxially of the incident light beam 18 and constructed of clear glass with an optically flat bottom. The container may be dimensioned with an internal diameter of 14½ mm. and an outside diameter of 16½ mm. The point of focus 19 of the diaphragm aperture image in the column of liquid 20 lies in the fields of vision of photo-electric cells 24. Container 22 has an internal diameter which is only slightly larger than the diameter of the incident beam 18 used for illuminating deeply colored liquids. A small aperture diaphragm 25, located at the base of container 22, functions to cut off stray light reflections and cooperates with lens 14 to direct approximately parallel rays of light as an incident beam upwardly into the turbid liquid in container 22.

The lower portion of container 22 is surrounded by a rectangular box the side wall of which consists of four photo-electric cells 24. Each of cells 24 presents a large viewing face (for example 37 x 14 mm.) to the adjacent wall of container 22, and the four cells are so arranged as to cooperatively collect a substantial proportion of the emergent Tyndall beam light dispersed by the turbid liquid. An apertured photo-cell cover 26 limits the length of incident beam viewed by the photo-cells and prevents leakage of stray light from above into the zone of the box formed by the cells 24. The four photo-electric cells 24 have their photo-sensitive surfaces connected electrically in parallel, and the supporting back surfaces also connected in parallel, to constitute a single measuring cell unit. (Fig. 2.)

A clear glass reflecting plate 28 is mounted at an angle in the path of the light beam transmitted by lens 14. The angle of the plate 28 is adjusted to deflect a portion of the light rays of the beam (for example 10%) at approximately right angles to the incident beam in the direction of a balancing or comparison photo-electric cell 30. The rays of light which are thus deflected from the main light beam are collected by a ground glass plate 32 which is illuminated thereby in an amount which is proportional to the illumination developed by the main incident beam. Light diffusely dispersed by the ground glass 32 passes through a polarizing disc 34 and is projected on the photo-sensitive face of cell 30. Since a high percentage of the light which is reflected by plate 28 is plane polarized, the amount of this light which is transmitted to photo-cell 30 can be adjusted by rotating the polarizing disc 34. The measuring cells 24, and the comparison cell 30, are connected electrically in a balancing circuit which includes a galvanometer 36 and a calibrating resistance or potentiometer 38. The photo-cell balancing circuit which is portrayed is a conventional Brice current bridge circuit.

Optical alignment of the incident and comparison beams involves focusing adjustment of the instrument to center an image of the filament of the lamp 10 on the lens 14. Heat absorbing filters are inserted in slots 40 and 42, and a neutral filter 44 is inserted in the path of the comparison beam. A slot is provided behind ground glass 32 for inserting the neutral filter to reduce the light intensity of the comparison beam to a level which can be taken care of by the intensity range of the polarizing disc 34. Polarizing disc 34 rotates through an angle of 90° in adjustments from minimum to maximum absorption of light. The neutral filter is selected to have a transmission such that photo-electric balance is obtained when the polarizing disc 34 is set near its maximum transmission point, so that slight rotation of disc 34 has least effect on photo-electric balance.

The optical elements and the photo-electric measuring and comparison circuits of the present turbidity meter are so simple as to make it possible to assemble them into a compact portable housing not substantially exceeding 30 cubic inches in size. The optical elements of the instrument are shielded against infiltration of light from sources other than lamp 10, and the liquid under examination for turbidity is shielded against heating by the incident beam by means of the heat filters 40 and 42. By focusing an image of the lamp 10 in the plane of lens 14, inaccuracies in turbidity measurement which would otherwise be caused by variations in intensity and coloring of the light source are eliminated. Adjustments of the cross-section of the incident beam are effected by varying the size of the aperture of diaphragm 16 for the purpose of reducing to a minimum absorption effects of color or of stray light deflection by the liquid under examination, on turbidity measurements.

With the photo cells 24 mounted as illustrated, so that their photo-sensitive surfaces are positioned to view the entire lower portion of container 22, and to intercept a major proportion of the emergent Tyndall rays, calibration of the instrument is initiated by inserting a standard, substantially colorless turbidity calibrating cylinder of known low turbidity in the position occupied by container 22 in Fig. 1, and adjusting the size of the aperture of diaphragm 16 to project an incident beam 18 of small cross-section (for example, 8 mm. diameter, as indicated by dotted lines in Fig. 1) into and through said standard turbidity cylinder. Use of four photo-electric cells 24 arranged in parallel as indicated, raises the sensitivity of the instrument to a high value corresponding, for example, to a current of 66 micro-amperes developed by the four photo cells. Photo-electric balance with the standard calibrating cylinder in place is obtained with lamp 10 operating at full brightness, by setting potentiometer 38 to full resistance, and bringing the galvanometer 36 to zero deflection by rotating polarizing disc 34. This balances the photo-cell currents for a turbidity which corresponds to that of the standard calibrating cylinder.

For determining the turbidity of a liquid having a turbidity no greater than that of the standard turbidity cylinder, the standard cylinder is replaced by container 22 filled with such liquid, and the potentiometer 38 is adjusted to bring the reading of the galvanometer 36 to zero deflection. At zero deflection of the galvanometer the reading of the potentiometer scale measures the turbidity of the liquid under test as per cent turbidity of the standard calibrating cylinder.

When the turbidity of the liquid under test is greater than that of the standard turbidity cylinder, the photo-electric circuit is first balanced with the standard turbidity cylinder in place, as previously described. Neutral filter 44 is then removed, and a photo-electric balance is again obtained by adjusting the potentiometer 38 as above described. The potentiometer reading at balance will now be less than maximum (or 100) and will in fact read directly the per cent transmission of the removed filter 44. Thus, if the filter 44 has a transmission of 50%, the potentiometer reading will be 50% with the standard calibrating cylinder in place when photo-electric balance is obtained with the neutral filter 44 removed. Using this condition of balance, turbidity determinations are made on liquids with greater turbidity than standard in the same manner as previously described. Assuming that the transmission of the removed filter 44 is 50%, liquids giving scale readings of 50–100% on the potentiometer dial will have actual turbidity values of 100–200% of the standard turbidity cylinder. The actual turbidity value for any scale reading will be equal to the scale reading for the liquid divided by the fractional scale reading obtained when the filter 44 is removed. Thus a scale reading of 75% for the liquid would give an actual turbidity of 75/0.5 equals 150%. The scale on the potentiometer dial underlying the potentiometer needle may be calibrated to indicate directly the turbidity of the liquid 20 expressed either in foot candles, or as a percentage of the turbidity of the standard turbidity cylinder.

For measuring the turbidity of dark colored liquids, aperture 17 of diaphragm 16 is enlarged to project an incident beam 18 of increased cross-section (for example, 12 mm. diameter—shown in full lines in Fig. 1). Such enlarged aperture 17 may be used, for example, for turbidity measurements on raw sugar filtrates or other dark colored liquids, the color of which is darker than a washed, raw sugar liquor. For the purpose of indicating the amount of coloring matter which is present in a liquid under examination for turbidity, broad band absorption filters may be inserted in slots 46 and 48. Such absorption filters give an indication of liquid color expressed as per cent transmission of light of a color which is strongly absorbed by the liquid. Such color indications are advantageous primarily as an aid in correcting for the effect of color on turbidity measurements. The effect of color on the turbidity measurement can be balanced out by introducing a body of the liquid under test of proper depth in the comparison beam. While the lengths of the paths of the light rays vary considerably in the volume of container 22 which is viewed by the photo-electric cells, there is one length of path through the liquid which is an average of all paths. Consequently, when some of the same liquid of this average depth (measured along the axis of the comparison beam) is placed in the path of the comparison beam within a rectangular vessel 50, then the comparison beam will be reduced in intensity by the same amount as the emergent Tyndall beam has been reduced by the presence of color in the liquid in container 22. Vessel 50 may have an internal thickness ranging from ½ to 2 centimeters, and is designed to hold some of the liquid under examination for turbidity in the path of the comparison beam. The comparison beam will not be affected except in a small degree by the turbidity of the liquid in vessel 50. Therefore, on balancing the photo cell circuits, the potentiometer scale gives a close approximation of the turbidity of the sample unaffected by color.

When using the balanced photo cell circuit for making color measurements, a photo-electric balance is first made with a standard colorless turbidity cylinder in the position of container 22, with a suitable color filter in slot 46, and with a rectangular vessel 50 of 1 cm. internal thickness containing the liquid under examination, in the path of the comparison beam. Because of the increased absorption of light due to the presence of the colored liquid in vessel 50, it is necessary to remove neutral filter 44, or to replace it with a neutral filter of higher transmission when obtaining this photo-electric balance. After obtaining this initial photo-electric balance, the vessel 50 and its contents is removed from the comparison beam, and a second photo-electric balance is made by turning the potentiometer dial until zero deflection is obtained on the galvanometer. The potentiometer scale reading gives directly the per cent transmission of the color component of the liquid plus that of the vessel 50 and of the solvent. This value can be corrected to give the per cent transmission due to color alone by repeating the measurement in the same manner outlined above, but with the vessel 50 filled with solvent only. These scale readings in this case give directly the comparison transmission of the vessel plus solvent. Multiplying the per cent transmission of the component color plus vessel plus solvent by this value, gives the per cent transmission due to color alone.

Color transmission is usually reported for liquid bodies of 1 cm. depth. However, for dark colored liquids, a vessel 50 of ½ cm. depth is preferably used. To correct the readings obtained to per cent transmission for a 1 cm. depth of liquid, the correct color reading represents the square of the value obtained for the vessel of ½ cm. depth. Vessels 50 of ½ cm. depth have been used to obtain color measurements for the darkest raw sugar liquors encountered in commercial sugar refining. Vessels 50 of even smaller thickness or depth would have to be used for color determination on liquids of such dark color that their light absorption is greater than the light absorbed by the neutral filter 44 normally placed in the path of the comparison beam. There should always be as much light available for energizing the photo-cell 30 in the path of the comparison beam as there is light available for energizing the measuring photo cells 24, in order to obtain an initial photoelectric balance.

Since many variations may be made from the illustrative details given, without departing from the scope of the invention, it is intended that the invention should be limited only by the claims.

What I claim is:

1. Apparatus for measuring the turbidity of a liquid which comprises, a source of light, a lens positioned to collect light rays from said source and form an image of the source, a second lens mounted in the light beam in the plane of said image and projecting an illuminating light beam, a transparent container for said liquid mounted in the path of the illuminating beam projected by said second lens in position to transmit an incident beam of light through a body of said liquid, an apertured diaphragm mounted coaxially across the path of the beam projected by said image forming lens, the aperture size of said diaphragm being adjustable whereby to vary the cross sectional area of the incident beam between a value only slightly less than the cross sectional area of the liquid body in the path of the incident beam and a value representing a small fraction of said area, a transparent deflector plate mounted at an angle in the path of said illuminating light beam, a ground glass plate mounted at the focusing point of light rays deflected by said plate in position to transmit said rays as a comparison beam, means for adjusting the illumination intensity of said comparison beam to a definite proportional relation with respect to the illumination intensity of the incident beam, a photo-electric cell unit mounted in the paths of Tyndall beams emerging from liquid illuminated by the incident beam, a second photo-electric cell disposed in the path of the comparison beam, and a balancing bridge circuit incorporating a galvanometer and a calibrated variable resistance connected with the photo-electric cell units whereby to measure the relative strengths of the currents developed thereby.

2. Apparatus for determining the turbidity of a liquid which comprises, a source of light, a lens positioned to collect light rays from said source and form an image of the source, a second lens mounted in the light beam in the plane of said image and projecting an illuminating light beam, a transparent container for said liquid mounted in the path of the illuminating beam in position to transmit an incident beam of light through a body of said liquid, an apertured diaphragm mounted coaxially between the first and second lenses, the aperture size of said diaphragm being adjustable for varying the cross-section of the incident beam in accordance with the depth of color present in the liquid, means positioned to deflect rays of light from said illuminating beam as a comparison beam, means for adjusting the illumination intensity of said comparison beam to a definite proportional relation with respect to the illumination intensity of the incident beam, a photo-electric cell unit mounted in the paths of Tyndall rays emerging from liquid illuminated by the incident beam, said unit being dimensioned and arranged to photo-electrically absorb a high proportion of the total Tyndall rays emerging from the liquid and to thereby generate sufficient current to provide sensitive turbidity measurements, a second photo-electric cell disposed in the path of the comparison beam, and a balancing bridge circuit incorporating a galvanometer and a calibrated variable resistance connected in electric circuit with the said photo-electric cell units whereby to measure the relative strengths of the currents developed thereby.

MORROW C. MILLER.

REFERENCES CITED

The following references are of record in the file of this patent:

UNITED STATES PATENTS

| Number | Name | Date |
| --- | --- | --- |
| 1,864,092 | Pearson | June 21, 1932 |
| 1,971,443 | Exton | Aug. 28, 1934 |
| 2,045,124 | Cummins et al. | June 23, 1936 |
| 2,165,054 | Johnson | July 4, 1939 |
| 2,254,782 | Riche | Sept. 2, 1941 |
| 2,263,938 | West | Nov. 25, 1941 |
| 2,301,367 | Cahusac et al. | Nov. 10, 1942 |

FOREIGN PATENTS

| Number | Country | Date |
| --- | --- | --- |
| 852,120 | France | Oct. 16, 1939 |

OTHER REFERENCES

"The Photronic Nephelometer," an article by C. H. Greene in Journal of the American Chemical Society for June, 1934; pages 1270 and 1271 cited. (Copy in Scientific Library, U. S. Patent Office.)